United States Patent
Liu

(10) Patent No.: US 11,533,697 B2
(45) Date of Patent: Dec. 20, 2022

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Jianhua Liu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/386,240

(22) Filed: Jul. 27, 2021

(65) Prior Publication Data
US 2021/0360566 A1 Nov. 18, 2021

Related U.S. Application Data

(63) Continuation of application No. PCT/CN2019/074506, filed on Feb. 1, 2019.

(51) Int. Cl.
*H04W 60/00* (2009.01)
*H04W 8/24* (2009.01)

(52) U.S. Cl.
CPC ............ *H04W 60/00* (2013.01); *H04W 8/24* (2013.01)

(58) Field of Classification Search
CPC ................ H04W 8/24; H04W 60/00
(Continued)

(56) References Cited

U.S. PATENT DOCUMENTS 10,425,450 B2 * 9/2019 Atarius .................. H04W 8/22
2005/0272449 A1 * 12/2005 Gallagher ............. H04W 36/14
455/458
(Continued)

FOREIGN PATENT DOCUMENTS

CN 101489218 A 7/2009
CN 102204217 A 9/2011
(Continued)

OTHER PUBLICATIONS

3GPP TR 23.743 V1.2.0 (Mar. 2019)—3rd Generation Partnership Project Technical Specification Group Services and System Aspects; Study on optimisations of UE radio capability signalling (Release 16) (clean/marked) (116 pages).
(Continued)

*Primary Examiner* — Congvan Tran
(74) *Attorney, Agent, or Firm* — Perkins Coie LLP

(57) ABSTRACT

Implementations of the present application provide a wireless communication method, a terminal device, and a network device. A terminal device can report, by means of reporting capability identifiers, capability information supported thereby; a network device can also store corresponding capability identifiers to store the capability information registered by all terminal devices, so as to reduce signaling overhead caused by capability information reporting and storage. The wireless communication method comprises: a terminal device sends first information during an initial registration process, the first information comprising at least one capability identifier, each capability identifier being used for identifying a type of capability information supported by the terminal device, and the at least one capability identifier being assigned by the manufacturer of the terminal device.

14 Claims, 3 Drawing Sheets

(58) Field of Classification Search
USPC .................................................. 455/435.1
See application file for complete search history.

(56) References Cited

U.S. PATENT DOCUMENTS

| | | | | |
|---|---|---|---|---|
| 2012/0157139 A1* | 6/2012 | Noh | .................. | H04W 72/0406 455/507 |
| 2017/0041284 A1* | 2/2017 | Chen | ...................... | H04L 67/24 |
| 2020/0008037 A1* | 1/2020 | Arora | ...................... | H04W 4/90 |

FOREIGN PATENT DOCUMENTS

| | | | |
|---|---|---|---|
| CN | 103517259 | A | 1/2014 |
| CN | 108464024 | A | 8/2018 |
| CN | 108810876 | A | 11/2018 |
| CN | 109076367 | A | 12/2018 |
| CN | 109196838 | A | 1/2019 |
| EP | 3371992 | A1 | 9/2018 |
| EP | 3611948 | A1 | 2/2020 |
| EP | 3833067 | A1 | 6/2021 |
| WO | 2018144421 | A1 | 8/2018 |
| WO | 2018202138 | A1 | 11/2018 |
| WO | 2019066190 | A1 | 4/2019 |

OTHER PUBLICATIONS

3GPP TS 38.306 V15.1.0 (Mar. 2018)—3rd Generation Partnership Project; Technical Specification Group Radio Access Network; NR; User Equipment (UE) radio access capabilities (Release 15) (25 pages).
International Search Report dated Sep. 18, 2019 of PCT/CN2019/074506 (4 pages).
3GPP "Study on optimisations of UE radio capability signalling (Release 16)" 3GPP TR 23.743 V1.0.0 (Dec. 2018); 52 pages.
Ericsson "UE capability "compression"" Tdoc R2-1704431; 3GPP TSG-RAN WG2 #98 Hangzhou, China, May 15-19, 2017. 2 pages.
Extended European Search Report for European Application No. 19912236.7 dated Dec. 7, 2021. 11 pages.
Intel "On UE capability handling based on UE capability ID" S2-183159; SA WG2 Meeting #127; Sanya, P.R. China; Apr. 16-20, 2018. 3 pages.
Examination Report for Indian Application No. 202117038388 dated Mar. 4, 2022. 5 pages with English translation.
First Office Action for Chinese Application No. 202110477350.7 dated Feb. 25, 2022. 14 pages with English translation.
Examination Report dated Sep. 5, 2022 of European Patent Application No. 19912236.7 (6 pages).
Second Office Action dated Jun. 20, 2022 of Chinese Patent Application No. 202110477350.7 with English translation (19 pages).
Third Office Action dated Sep. 7, 2022 of Chinese Patent Application No. 202110477350.7 with English translation (17 pages).

* cited by examiner

WIRELESS COMMUNICATION METHOD, TERMINAL DEVICE, AND NETWORK DEVICE

CROSS-REFERENCE TO RELATED APPLICATIONS

The present application is a continuation application of International PCT Application No. PCT/CN2019/074506, having an international filing date of Feb. 1, 2019. The content of the above-identified application is hereby incorporated by reference.

TECHNICAL FIELD

Implementations of the present application relate to a field of communication, and more specifically, to a wireless communication method, a terminal device and a network device.

BACKGROUND

Capability information of a terminal device is reported to an access network device during a registration or updating of a registration. Then the access network device sends the capability information of the terminal device to a core network device for storage. When the terminal device initiates a connection establishment request, the access network device requests the core network device for the capability information of the terminal device, and then provides configuration for the terminal device according to obtained capability information. However, with more and more features supported by the terminal device, the capability information of the terminal device will become larger and larger. Reporting the capability information of the terminal device will bring huge signaling overhead. At the same time, the core network device needs to save registered capability information of all the terminal devices, which will also cause a greater load on the core network device.

SUMMARY

Implementations of the present application provide a wireless communication method, a terminal device and a network device. The terminal device may report its supported capability information by reporting a capability identifier, and the network device may also store corresponding capability identifier to save registered capability information of all terminal devices, thereby reducing signaling overhead brought by reporting and storing the capability information.

In a first aspect, a wireless communication method is provided, including: sending, by a terminal device, first information in an initial registration process, wherein the first information includes at least one capability identifier, each capability identifier is used for identifying a kind of capability information supported by the terminal device, and the at least one capability identifier is assigned by a manufacturer of the terminal device.

For example, the terminal device always reports the first information in the initial registration process when the terminal device is powered on.

Optionally, the terminal device sends the first information to the access network device and/or the core network device in the initial registration process.

In a second aspect, a wireless communication method is provided, including: receiving, by a network device, first information in an initial registration process of an opposite device, wherein the first information includes at least one capability identifier, each capability identifier is used for identifying a kind of capability information supported by the opposite device, and the at least one capability identifier is assigned by a manufacturer of the opposite device.

Optionally, the opposite device may be a terminal device. That is, the network device receives the first information sent by the terminal device in the initial registration process of the terminal device.

Optionally, the network device may be an access network device or a core network device.

In a third aspect, a terminal device is provided, configured to perform the method in the first aspect or each implementation thereof.

Specifically, the terminal device includes function modules for performing the method in the above first aspect or each implementation thereof.

In a fourth aspect, a network device is provided, configured to perform the method in the second aspect or each implementation thereof.

Specifically, the network device includes functional modules for performing the method in the above second aspect or each implementation thereof.

In a fifth aspect, a terminal device is provided, including a processor and a memory. The memory is configured to store a computer program, and the processor is configured to call and run the computer program stored in the memory to execute the method in the first aspect or each implementation thereof.

In a sixth aspect, a network device is provided, including a processor and a memory. The memory is configured to store a computer program, and the processor is configured to call and run the computer program stored in the memory to execute the method in the second aspect or each implementation thereof.

In a seventh aspect, a chip is provided, configured to implement the method in any one of the above first to second aspects or each implementation thereof.

Specifically, the chip includes a processor configured to call and run a computer program from a memory, causing the device on which the chip is installed to execute the method in any one of the above first to second aspects or each implementation thereof.

In an eighth aspect, a computer-readable storage medium is provided, configured to store a computer program that causes a computer to execute the method in any one of the above first to second aspects or each implementation thereof.

In a ninth aspect, a computer program product is provided, including computer program instructions that cause a computer to execute the method in any one of the above first to second aspects or each implementation thereof.

In a tenth aspect, a computer program is provided, which, when run on a computer, causes the computer to execute the method in any one of the above first to second aspects or each implementation thereof.

With the above technical scheme, the terminal device may report its supported capability information by reporting the capability identifier, and the network device may also store corresponding capability identifier to save registered capability information of all terminal devices, thereby reducing signaling overhead brought by reporting and storing the capability information.

DETAILED DESCRIPTION

Technical solutions in implementations of the present application will be described below with reference to the drawings in implementations of the present application. It is apparent that the implementations described are a part of implementations of the present application, but not all implementations of the present application. According to the implementations of the present application, all other implementations achieved by a person of ordinary skill in the art without paying an inventive effort are within the protection scope of the present application.

Implementations of the present application can be applied to various communication systems, such as a global system of mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, evolution system of NR system, an LTE-based access to unlicensed spectrum (LTE-U) system, an NR-based access to unlicensed spectrum (NR-U) system, a Universal Mobile Telecommunications System (UMTS), a Wireless Local Area Networks (WLAN), Wireless Fidelity (WiFi), a next generation communication system or other communication systems, etc.

Generally speaking, a traditional communication system supports a limited number of connections and is easy to be implemented. However, with a development of communication technology, a mobile communication system will not only support traditional communication, but also support, for example, Device to Device (D2D) communication, Machine to Machine (M2M) communication, Machine Type Communication (MTC), and Vehicle to Vehicle (V2V) communication, etc. And implementations of the present application may also be applied to these communication systems.

Optionally, a communication system in an implementation of the present application may be applied to a Carrier Aggregation (CA) scenario, a Dual Connectivity (DC) scenario, and a Standalone (SA) network deployment scenario.

Implementations of the present application do not limit applied frequency spectrums. For example, implementations of the present application may be applied to both licensed spectrum and unlicensed spectrum.

Figures 1, 2:
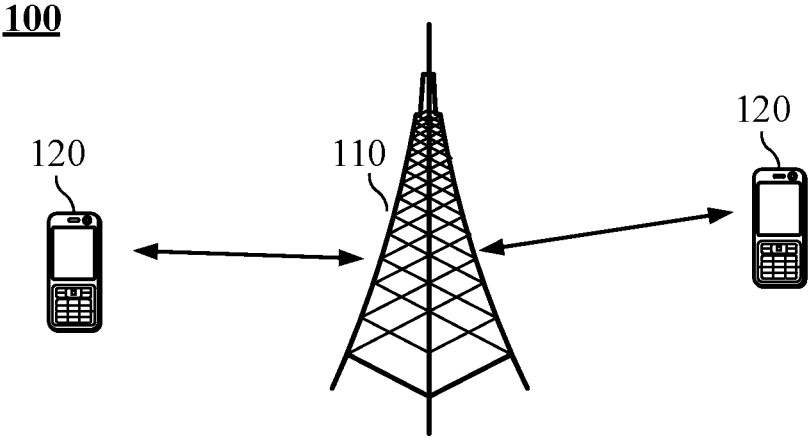
FIG. 1 is a schematic diagram of an architecture of a communication system according to an implementation of the present application.
FIG. 2 is a schematic flowchart of a wireless communication method according to an implementation of the present application.

Illustratively, a communication system 100 applied in an implementation of the present application is shown in FIG. 1. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area.

FIG. 1 shows one network device and two terminal devices as an example. Optionally, the communication system 100 may include multiple network devices, and other quantity of terminal devices may be included within the coverage area of each network device, which is not limited in the implementations of the present application.

Optionally, the communication system 100 may include other network entities such as a network controller, and a mobile management entity, which is not limited in the implementations of the present application.

It should be understood that, a device with a communication function in a network/system in the implementation of the present application may be referred to as a communication device. Taking the communication system 100 shown in FIG. 1 as an example, the communication device may include a network device 110 and a terminal device 120 which have communication functions, and the network device 110 and the terminal device 120 may be specific devices described above, which will not be describe here again. The communication devices may also include other devices in the communication system 100, such as a network controller, a mobile management entity, and other network entity, and which is not limited in the implementations of the present application.

Implementations of the present application describe various implementations in combination with a terminal device and a network device, wherein the terminal device may also be referred to User Equipment (UE), an access terminal, a subscriber unit, a subscriber station, a mobile station, a rover platform, a remote station, a remote terminal, a mobile device, a user terminal, a terminal, a wireless communication equipment, a user agent or a user device, etc. The terminal device may be a STATION (ST) in WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, a vehicle-mounted device, a wearable device, and a next generation communication system, such as, a terminal device in an NR network, or a terminal device in a future evolving Public Land Mobile Network (PLMN), etc.

By way of example but not limitation, in the implementation of the present application, the terminal device may also be a wearable device. Wearable devices may also be referred to as a wearable smart device, which is a general term of wearable devices which are developed by performing intelligent design to daily wear using wearable technique, such as glasses, gloves, watches, clothing and shoes, etc. Wearable devices are portable devices that are worn directly on the body or integrated into the clothes or accessories of users. Wearable devices are not only hardware devices, but also realize powerful functions through software support, data interaction and cloud interaction. Generalized wearable smart devices include complete or partial functions that are full functioned, large sized, and may be realized without relying on smart phones, such as smart watches or smart glasses, etc., and functions that are only focused on a certain kind of application and need to be used in conjunction with other devices such as smart phones, such as various smart bracelets and smart jewelry for monitoring physical signs.

The network device may be a network device for communicating with a mobile device, or may be an Access Point (AP) in the WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device (gNB) in an NR network, or a network device in the future evolved PLMN network.

In an implementation of the present application, the network device provides service for a cell, and the terminal device communicates with the network device through a transmission resource (e.g., frequency domain resource or spectrum resource) used by the cell. The cell may be a cell corresponding to the network device (e.g., base station), and the cell may belong to a Macro base station or a base station corresponding to a Small cell. The small cells here may include: Metro cell, Micro cell, Pico cell, Femto cell, etc. These small cells have the characteristics of small coverage and low transmission power, and are suitable for providing high-speed data transmission services.

In an implementation of the present application, a manufacturer of the terminal device may assign a capability identifier that identifies the capability information. For example, when the terminal device leaves a factory, the manufacturer of the terminal device assigns a capability identifier that identifies the capability information.

It should be understood that the capability identifier assigned by the terminal device manufacturer depends on the terminal manufacturer configuring a terminal capability identifier and corresponding terminal capability information to an operator. However, in many cases, the terminal manufacturer cannot configure the capability identifier and the corresponding terminal capability information to the operator. From a perspective of the terminal, once the terminal device is put into market, it is impossible to know whether the operator stores information configured by the manufacturer. Therefore, it is necessary to design whether the terminal device reports the terminal capability identifier and how to deal with it after the network device cannot recognize the capability identifier after the terminal device reports it.

FIG. 2 is a schematic flowchart of a wireless communication method 200 according to an implementation of the present application. As shown in FIG. 2, the method 200 includes following contents.

In S210, a terminal device sends first information to a network device in an initial registration process, wherein the first information includes at least one capability identifier, each capability identifier is used for identifying a kind of capability information supported by the terminal device, and the at least one capability identifier is assigned by a manufacturer of the terminal device.

S220, the network device receives the first information.

It should be noted that the at least one capability identifier may be assigned by the manufacturer of the terminal device when the terminal device leaves a factory.

Optionally, in an implementation of the present application, the first information also includes manufacturer information of the terminal device.

Optionally, after the network device receives the first information, if the network device does not support the capability identifier assigned by the manufacturer of the terminal device or cannot identify the at least one capability identifier, the network device requires the terminal device to report explicit capability information. Or, if the network device can identify the at least one capability identifier, the network device may provide corresponding configuration for the terminal device based on this.

It should be noted that the network device does not support the capability identifier assigned by the manufacturer of the terminal device, may be understood as that the network device does not support the capability identifier assigned by the manufacturer of the terminal device, or may be understood as that the network device does not support the capability identifier assigned by all manufacturers of the terminal device, that is, the network device does not have an ability to identify the capability identifier assigned by the manufacturer of the terminal device.

It should also be noted that the network device cannot identify the at least one capability identifier, may be understood as that the network device cannot identify part or all of the at least one capability identifier.

Optionally, the network device may be configured with a corresponding relationship between the capability information and the capability identifier, and the network device may identify the at least one capability identifier according to the corresponding relationship.

Optionally, if the network device does not support the capability identifier assigned by the manufacturer of the terminal device or cannot identify the at least one capability identifier, the network device sends first indication information to the terminal device, wherein the first indication information is used for indicating the terminal device to report supported capability information. Further, in response to the first indication information, the terminal device sends second information to the network device, wherein the second information includes capability information supported by the terminal device.

Specifically, the first indication information is specifically used for indicating the terminal device to report at least one piece of the following information: Public Land Mobile Network (PLMN) capability information, Radio Access Technology (RAT) capability information, system capability information, frequency band capability information, frequency band combination capability information, or terminal type capability information.

Optionally, after receiving the second information, the network device may assign capability identification information to the terminal device based on the capability information supported by the terminal device. Further, the network device sends third information to the terminal device, wherein the third information includes capability identification information assigned to the terminal device. That is to say, after assigning the capability identification information, the network device may provide this capability identification information to the terminal device.

Optionally, in an implementation of the present application, the network device may be an access network device. After the access network device assigns the capability identification information to the terminal device, the access network device provides assigned capability identification information to a core network device, and may also provide the second information received from the terminal device to the core network device. For example, the access network device sends the second information and the third information to the core network device, wherein the second information includes the capability information supported by the terminal device and the third information includes the capability identification information assigned to the terminal device. Further, the core network device stores the capability identification information and the capability information supported by the terminal device.

Optionally, in an implementation of the present application, the network device may be a core network device. After the core network device assigns the capability identification information to the terminal device, the assigned capability identification information may be provided to the access network device. For example, the core network device stores the second information and the capability identification information assigned for the terminal device, and sends the third information to the access network device serving the terminal device, wherein the third information includes the capability identification information assigned to the terminal device.

Optionally, in an implementation of the present application, before S210, the terminal device may also determine whether to send the first information in the initial registration process. And when it is determined that the first information is sent in the initial registration process, the terminal device sends the first information to the network device in the initial registration process. That is, the terminal device performs S210 only if it is determined that the first information is sent in the initial registration process.

Optionally, the terminal device determines whether to send the first information in the initial registration process for first PLMN according to pre-configured information, wherein the pre-configured information is used for indicating whether the terminal capability information assigned by the manufacturer of the terminal device is stored at the first PLMN.

For example, if the pre-configured information indicates that the terminal capability information is stored at the first PLMN, the terminal device determines to send the first information in the initial registration process for the first PLMN.

For another example, if the pre-configured information indicates that the terminal capability information is not stored at the first PLMN, the terminal device determines not to send the first information in the initial registration process for the first PLMN.

It should be noted that the first PLMN may be a PLMN selected by the terminal device through a PLMN selection process.

Optionally, the terminal device may determine whether to send the first information in the initial registration process according to information provided by the network device.

Specifically, the terminal device receives fourth information sent by the network device, wherein the fourth information is used for indicating whether the terminal capability information assigned by the manufacturer of the terminal device is stored at the network device. Further, the terminal device determines whether to send the first information in the initial registration process according to the fourth information.

For example, if the fourth information indicates that the terminal capability information is stored at an opposite device, the terminal device determines to send the first information in the initial registration process.

For another example, if the fourth information indicates that the terminal capability information is not stored at the opposite device, the terminal device determines to ignore sending the first information in the initial registration process.

It should be noted that the fourth information may also indicate that no terminal capability information assigned by any terminal device manufacturer is stored at the network device.

For example, if the information provided by the network device to the terminal device indicates that terminal capability information of a manufacturer to which the terminal device belongs is stored at the network device, the terminal device carries the capability identification information assigned by the manufacturer in the initial registration process. Otherwise, the capability identification information assigned by the manufacturer is not carried.

Optionally, the fourth information includes: capability information assigned by the terminal device manufacturer stored or not stored at the network device, and/or terminal device information which can or cannot provide the capability identification information assigned by the terminal device manufacturer.

The fourth information may be, for example, that capability information of the manufacturer to which the terminal device belongs is stored or not stored at the network device; and/or terminal devices of which manufacturer can or cannot provide the capability identification information assigned by the manufacturers.

Optionally, the fourth information is for one of the following: a first PLMN, a first registration area, or a first tracking area.

For example, the fourth information may be information based on a specific PLMN; or information based on a specific area, such as a specific registration area, a specific tracking area, etc.

Optionally, the terminal device receives the fourth information sent by the network device through system broadcast information.

Optionally, the terminal capability information includes a corresponding relationship between the capability identifier and the capability information supported by the terminal device, and/or manufacturer information of the terminal device.

Therefore, in an implementation of the present application, a terminal device may report its supported capability information by reporting capability identifier, and a network device may also store corresponding capability identifier to store the capability information registered by all terminal devices, thus reducing signaling overhead brought by reporting and storing the capability information.

Further, in an implementation of the present application, the terminal device may directly report the capability identifier in an initial registration process, or may also determine whether to report the capability identifier in the initial registration process based on pre-configured information or the information provided by the network device, so that the capability identifier may be reported.

Further, when the network device receives the capability identifier assigned by the manufacturer supported by the terminal device, and can not identify the capability identifier or does not have terminal capability information of the manufacturer to which the terminal belongs, the network device acquire explicit capability information from the terminal device.

Figure 3:
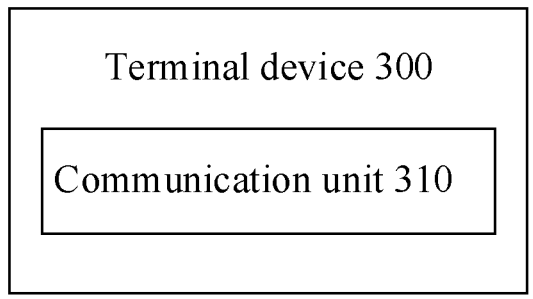
FIG. 3 is a schematic block diagram of a terminal device according to an implementation of the present application.

FIG. 3 shows a schematic block diagram of a terminal device 300 according to an implementation of the present application. As shown in FIG. 3, the terminal device 300 includes a communication unit 310.

The communication unit 310 is configured to send first information in an initial registration process, wherein the first information includes at least one capability identifier, each capability identifier is used for identifying a kind of capability information supported by the terminal device, and the at least one capability identifier is assigned by a manufacturer of the terminal device.

Optionally, the first information further includes manufacturer information of the terminal device.

Optionally, the communication unit 310 is further configured to receive first indication information, wherein the first indication information is used for indicating the terminal device to report supported capability information.

In response to the first indication information, the communication unit 310 is further configured to send second information, wherein the second information include capability information supported by the terminal device.

Optionally, the first indication information is specifically used for indicating the terminal device to report at least one piece of the following information: PLMN capability information, RAT capability information, system capability information, frequency band capability information, frequency band combination capability information, or terminal type capability information.

Optionally, the communication unit 310 is further configured to receive third information, wherein the third information includes capability identification information assigned to the terminal device.

Optionally, the terminal device 300 further includes a processing unit 320.

The processing unit 320, is configured to determine whether to send the first information in the initial registration process.

Optionally, the processing unit 320 is specifically configured to: determine whether to send the first information in the initial registration process for the first PLMN according to pre-configured information, wherein the pre-configured information is used for indicating whether the terminal capability information assigned by the manufacturer of the terminal device is stored at the first PLMN.

Optionally, the processing unit 320 is specifically configured to: determine to send the first information in the initial registration process for the first PLMN, if the pre-configured information indicates that the terminal capability information is stored at the first PLMN; or, determine to ignore sending the first information in the initial registration process for the first PLMN, if the pre-configured information indicates that the terminal capability information is not stored at the first PLMN.

Optionally, the communication unit 310 is further configured to receive fourth information, wherein the fourth information is used for indicating whether the terminal capability information assigned by the manufacturer of the terminal device is stored at an opposite device. The processing unit 320 is specifically configured to: determine whether to send the first information in the initial registration process according to the fourth information.

Optionally, the processing unit 320 is specifically configured to: determine to send the first information in the initial registration process, if the fourth information indicates that the terminal capability information is stored at the opposite device; or, determine to ignore sending the first information in the initial registration process, if the fourth information indicates that the terminal capability information is not stored at the opposite device.

Optionally, the fourth information includes: capability information assigned by a terminal device manufacturer stored or not stored at the opposite device, and/or terminal device information that can or cannot provide capability identification information assigned by the terminal device manufacturer.

Optionally, the fourth information is for one of the following: a first PLMN, a first registration area, or a first tracking area.

Optionally, the communication unit 310 is specifically configured to: receive the fourth information through system broadcast information.

Optionally, the terminal capability information includes a corresponding relationship between the capability identifier and the capability information supported by the terminal device, and/or manufacturer information of the terminal device.

It should be understood that the terminal device 300 according to the implementation of the present application may correspond to the terminal device in the method implementation of the present application. And the above-mentioned and other operations and/or functions of various units in the terminal device 300 are respectively for implementing the corresponding processes of the terminal device in the method 200 shown in FIG. 2, which will not be repeated here again for sake of conciseness.

Figure 4:
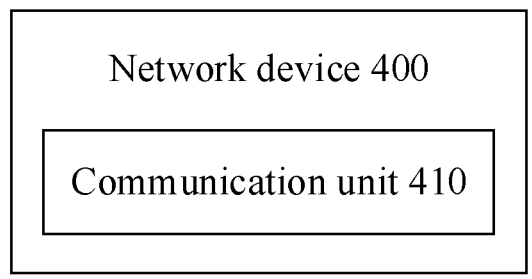
FIG. 4 is a schematic block diagram of a network device according to an implementation of the present application.

FIG. 4 shows a schematic block diagram of a network device 400 according to an implementation of the present application. As shown in FIG. 4, the terminal device 400 includes a communication unit 410.

The communication unit 410 is configured to receive first information during an initial registration process of an opposite device, wherein the first information includes at least one capability identifier, each capability identifier is used for identifying a kind of capability information supported by the opposite device, and the at least one capability identifier is assigned by a manufacturer of the opposite device.

Optionally, the first information also includes manufacturer information of the opposite device.

Optionally, if the network device 400 does not support the capability identifier assigned by the manufacturer of the opposite device or cannot identify the at least one capability identifier, the communication unit 410 is further configured to send first indication information, wherein the first indication information is used for indicating the opposite device to report the supported capability information.

Optionally, the first indication information is specifically used for indicating the opposite device to report at least one of the following information: PLMN capability information, RAT capability information, system capability information, frequency band capability information, frequency band combination capability information, or terminal type capability information.

Optionally, the communication unit 410 is further configured to receive second information, where the second information includes capability information supported by the opposite device.

Optionally, the network device 400 further includes a processing unit 420.

The processing unit 420 is configured to assign capability identification information to the opposite device according to the second information.

The communication unit 410 is further configured to send third information, wherein the third information includes capability identification information assigned for the opposite device.

Optionally, the network device 400 is an access network device serving the opposite device, and the communication unit 410 is further configured to send the second information and the third information to a core network device.

Optionally, the network device 400 is a core network device, and the network device 400 further includes the processing unit 420.

The processing unit 420, configured to store the second information and the capability identification information assigned to the opposite device, and control the communication unit 410 to send the third information to the access network device serving the opposite device.

Optionally, when the communication unit 410 does not receive the first information, the communication unit 410 is further configured to send fourth information, where the fourth information is used for indicating whether the terminal capability information assigned by the manufacturer of the opposite device is stored at the network device.

Optionally, if the fourth information indicates that the terminal capability information is stored at the network device, the fourth information is further used for indicating the opposite device to send the first information in the initial registration process; or, if the fourth information indicates that the terminal capability information is not stored at the network device, the fourth information is further used for indicating the opposite device not to send the first information in the initial registration process.

Optionally, the fourth information includes: the capability information assigned by the manufacturer of the opposite device stored or not stored at the network device, and/or the opposite device information which can or cannot provide the capability identification information assigned by the manufacturer of the opposite device.

Optionally, the fourth information is for one of the following: a first PLMN, a first registration area, or a first tracking area.

Optionally, the communication unit 410 is further configured to send the fourth information through system broadcast information.

Optionally, the terminal capability information includes a corresponding relationship between the capability identifier and the capability information supported by the opposite device, and/or manufacturer information of the opposite device.

It should be understood that the network device 400 according to the implementation of the present application may correspond to the network device in the method implementations of the present application. And the above and other operations and/or functions of various units in the network device 400 are respectively for implementing the corresponding process of the network device in the method 200 shown in FIG. 2, which is not repeated here again for brevity.

Figure 5:
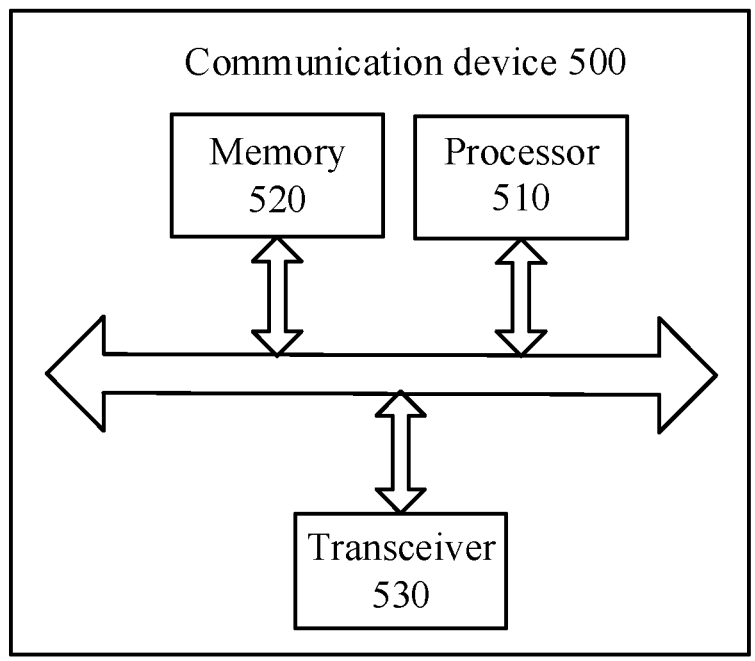
FIG. 5 is a schematic block diagram of a communication device according to an implementation of the present application.

FIG. 5 is a schematic diagram of structure of a communication device 500 according to an implementation of the present application. The communication device 500 shown in FIG. 5 includes a processor 510. The processor 510 may call and run a computer program from a memory to perform the method in the implementation of the present application.

Optionally, as shown in FIG. 5, the communication device 500 may further include a memory 520. Herein, the processor 510 may call and run a computer program from the memory 520 to perform the method in the implementation of the present application.

The memory 520 may be a separate device independent of the processor 510 or may be integrated in the processor 510.

Optionally, as shown in FIG. 5, the communication device 500 may further include a transceiver 530. And the processor 510 may control the transceiver 530 to communicate with another device. Specifically, information or data may be sent to another device or information or data sent by another device is received.

The transceiver 530 may include a transmitter and a receiver. The transceiver 530 may further include antennas, and a quantity of antennas may be one or more.

Optionally, the communication device 500 may specifically be a network device of an implementation of the present application, and the communication device 500 may implement the corresponding processes implemented by the network device in various methods of the implementations of the present application, which is not repeated again here for brevity.

Optionally, the communication device 500 may be specifically a mobile terminal/terminal device of an implementation of the present application, and the communication device 500 may implement the corresponding processes implemented by the mobile terminal/terminal device in the various methods of the implementations of the present application, which is not repeated here again for brevity.

Figure 6:
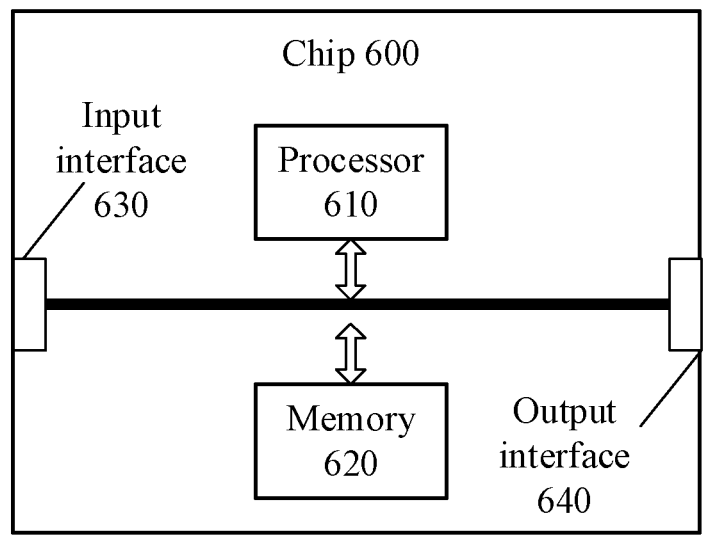
FIG. 6 is a schematic block diagram of a chip according to an implementation of the present application.

FIG. 6 is a schematic diagram of a structure of a chip of an implementation of the present application. A chip 600 shown in FIG. 6 includes a processor 610. The processor 610 may call and run a computer program from a memory to perform the method in the implementation of the present application.

Optionally, as shown in FIG. 6, the chip 600 may further include a memory 620. Herein, the processor 610 may call and run a computer program from the memory 620 to perform the method in the implementation of the present application.

Herein, the memory 620 may be a separate device independent of the processor 610 or may be integrated in the processor 610.

Optionally, the chip 600 may further include an input interface 630. Herein, the processor 610 may control the input interface 630 to communicate with another device or chip. Specifically, information or data sent by another device or chip may be acquired.

Optionally, the chip 600 may further include an output interface 640. Herein, the processor 610 may control the output interface 640 to communicate with another device or chip. Specifically, information or data may be output to another device or chip.

Optionally, the chip may be applied in a network device of the implementation of the present application, and the chip may implement the corresponding processes implemented by the network device in various methods of the implementations of the present application, which is not repeated here again for brevity.

Optionally, the chip may be applied in a mobile terminal/terminal device of the implementation of the present application, and the chip may implement the corresponding processes implemented by the mobile terminal/terminal device in the various methods of the implementations of the present application, which is not repeated here again for brevity.

It should be understood that the chip mentioned in the implementation of the present application may also be referred to as a system-level chip, a system chip, a chip system or a system-on-chip, etc.

Figure 7:
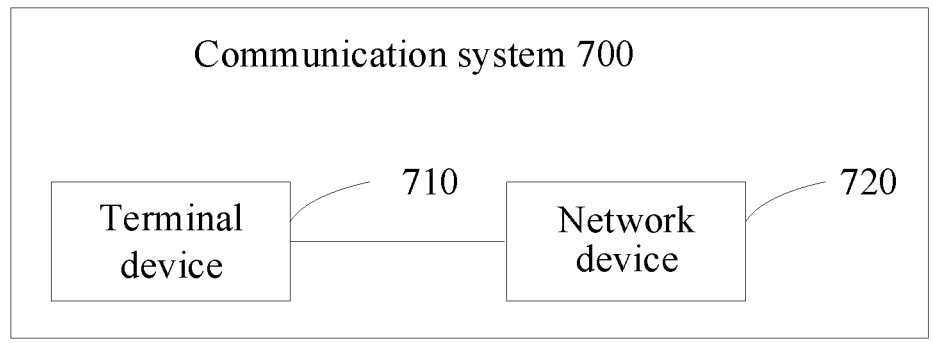
FIG. 7 is a schematic block diagram of a communication system according to an implementation of the present application.

FIG. 7 is a schematic block diagram of a communication system 700 provided by an implementation of the present application. As shown in FIG. 7, the communication system 700 may include a terminal device 710 and a network device 720.

Herein, the terminal device 710 may be configured to implement the corresponding functions implemented by the terminal device in the above method, and the network device 720 may be configured to implement the corresponding functions implemented by the network device in the above method, which is not repeated here again for brevity.

It should be understood that, the processor in the implementation of the present application may be an integrated circuit chip having a signal processing capability. In an implementation process, the acts of the above method implementations may be completed by using an integrated logic circuit of hardware in the processor or instructions in a form of software. The above processor may be a general purpose processor, a Digital Signal Processing (DSP), an Application Specific Integrated Circuit (ASIC), a (Field Programmable Gate Array (FPGA) or another programmable logic device, a discrete gate or a transistor logic device, or a discrete hardware component. Methods, acts and logical block diagrams disclosed in the implementations of the present application may be implemented or performed. The general purpose processor may be a microprocessor, or the processor may be any conventional processor or the like. The acts of the method disclosed with reference to the implementation of the present application may be directly embodied as executed and completed by a hardware decoding processor, or may be executed and completed by a combination of hardware and software modules in a decoding processor. The software modules may be located in a storage medium commonly used in the art, such as a random access memory, a flash memory, a read-only memory, a programmable read-only memory or an electrically erasable programmable memory, a register, etc. The storage medium is located in a memory, and the processor reads information in the memory and completes the acts of the above method in combination with its hardware.

It may be understood that, the memory in the implementation of the present application may be a volatile memory or a non-volatile memory, or may include both a volatile memory and a non-volatile memory. Herein, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. Through exemplary but not limitative description, many forms of RAMs may be used, for example, a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the system and methods described in this specification are intended to include, but are not limited to, these and any other suitable types of memories.

It should be understood that, the above memory is an example for illustration and should not be construed as limiting. For example, the memory in the implementations of the present application may also be a RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a Direct Rambus RAM (DR RAM), or the like. That is, memories in the implementations of the present application are aimed at including, but not limited to, these and any memory of another proper type.

An implementation of the present application further provides a computer readable storage medium, configured to store a computer program.

Optionally, the computer readable storage medium may be applied in a network device of an implementation of the present application, and the computer program causes the computer to perform the corresponding processes implemented by the network device in various methods of implementations of the present application, which is not repeated here again for brevity.

Optionally, the computer readable storage medium may be applied in a mobile terminal/terminal device of an implementation of the present application, and the computer program causes a computer to perform the corresponding processes implemented by the mobile terminal/terminal device in various methods of implementations of the present application, which is not repeated here again for brevity.

An implementation of the present application also provides a computer program product including computer program instructions.

Optionally, the computer program product may be applied in a network device of an implementation of the present application, and the computer program instructions cause a computer to perform the corresponding processes implemented by the network device in various methods of implementations of the present application, which is not repeated here again for brevity.

Optionally, the computer program product may be applied in a mobile terminal/terminal device of an implementation of the present application, and the computer program instructions cause a computer to perform the corresponding processes implemented by the mobile terminal/terminal device in various methods according to implementations of the present application, which is not repeated here again for brevity.

An implementation of the present application also provides a computer program.

Optionally, the computer program may be applied in a network device of an implementation of the present application. When the computer program is run on a computer, the computer is caused to perform the corresponding processes implemented by the network device in various methods of implementations of the present application, which is not repeated here again for brevity.

Optionally, the computer program may be applied in a mobile terminal/terminal device of an implementation of the present application. When the computer program is run on a computer, the computer is caused to perform the corresponding processes implemented by the mobile terminal/terminal device in various methods of implementations of the present application, which is not repeated here again for brevity.

Those of ordinary skill in the art may recognize that the exemplary elements and algorithm acts described in combination with the implementations disclosed herein can be implemented in electronic hardware, or a combination of computer software and electronic hardware. Whether these functions are executed in hardware or software depends on a particular application and a design constraint condition of a technical solution. Skilled artisans may use different methods to implement the described functions in respect to each particular application, but such implementation should not be considered to be beyond the scope of the present application.

Those skilled in the art may clearly learn that for convenience and conciseness of description, the specific working processes of the systems, apparatuses and units described above may refer to the corresponding processes in the aforementioned method implementations and is not repeated here again.

In several implementations provided by the present application, it should be understood that the disclosed systems, apparatuses and methods may be implemented in another way. For example, the apparatus implementations described above are only illustrative, for example, the division of the units is only a logical function division, and there may be another division mode in actual implementation, for example, multiple units or components may be combined or integrated into another system, or some features may be ignored or not executed. On the other hand, mutual coupling or direct coupling or communication connection shown or discussed may be indirect coupling or communication connection through some interfaces, apparatuses or units, or may be in electrical, mechanical or another form.

The unit described as a separate component may or may not be physically separated, and the component shown as a unit may or may not be a physical unit, i.e., it may be located in one place or may be distributed over multiple network units. Part or all of the units therein may be selected according to actual requirements to achieve a purpose of a solution the implementations.

In addition, functional units in various implementations of the present application may be integrated in one processing unit, or various units may be physically present separately, or two or more units may be integrated in one unit.

The functions may be stored in a computer readable storage medium if realized in a form of software functional units and sold or used as a separate product. Based on this understanding, the technical solution of the present application, in essence, or the part contributing to the prior art, or the part of the technical solution, may be embodied in a form of a software product. The computer software product is stored in a storage medium, including a number of instructions for causing a computer device (which may be a personal computer, a server, or a network device, or the like) to perform all or part of the acts of the methods described in various implementations of the present application. And the aforementioned storage medium includes: various kinds of media that may store program codes, such as a USB flash drive, a removable hard disk, a Read-Only Memory (ROM), a Random Access Memory (RAM), a magnetic disk, or an optical disc.

What are described above are merely specific implementations of the present application, but the protection scope of the present application is not limited thereto. Any variation or substitution that may be easily conceived by a person skilled in the art within the technical scope disclosed by the present application shall be included within the protection scope of the present application. Therefore, the protection scope of the present application shall be determined by the protection scope of the claims.

What we claim is:

1. A method for wireless communication, comprising:
   sending, by a terminal device, first information in an initial registration process, wherein the first information comprises at least one capability identifier, each capability identifier is used for identifying a kind of capability information supported by the terminal device, and the at least one capability identifier is assigned by a manufacturer of the terminal device; wherein
   the capability identifier corresponds to capability information of the terminal device; wherein the method, further comprises:
   receiving, by the terminal device, first indication information, wherein the first indication information is used for indicating the terminal device to report the capability information supported by the terminal device; and
   sending, by the terminal device, second information in response to the first indication information, where the second information comprises the capability information supported by the terminal device.

2. The method of claim 1, wherein the first information comprises manufacturer information of the terminal device.

3. The method of claim 1, wherein the first indication information is specifically used for indicating the terminal device to report at least one piece of following information:
   public land mobile network (PLMN) capability information, radio access technology (RAT) capability information, system capability information, frequency band capability information, frequency band combination capability information, or terminal type capability information.

4. The method of claim 1, the method further comprises:
   receiving, by the terminal device, third information, wherein the third information comprises capability identification information assigned to the terminal device.

5. A method for wireless communication, comprising:
   receiving, by a network device, first information in an initial registration process of an opposite device, wherein the first information comprises at least one capability identifier, each capability identifier is used for identifying a kind of capability information supported by the opposite device, and the at least one capability identifier is assigned by a manufacturer of the opposite device; wherein the capability identifier corresponds to capability information of the terminal device; wherein if the network device does not support the capability identifier assigned by the manufacturer of the opposite device or cannot identify the at least one capability identifier, the method further comprises:
   sending, by the network device, first indication information, wherein the first indication information is used for indicating the opposite device to report the capability information supported by the opposite device; wherein the method further comprises:
   receiving, by the network device, second information, wherein the second information comprises the capability information supported by the opposite device.

6. The method of claim 5, wherein the first information further comprises manufacturer information of the opposite device.

7. The method of claim 5, wherein the first indication information is specifically used for indicating the opposite device to report at least one piece of following information:
   public land mobile network (PLMN) capability information, radio access technology (RAT) capability information, system capability information, frequency band capability information, frequency band combination capability information, or terminal type capability information.

8. The method of claim 5, the method further comprises:
   assigning, by the network device, capability identification information to the opposite device according to the second information; and
   sending, by the network device, third information, wherein the third information comprises the capability identification information assigned to the opposite device.

9. A terminal device, comprising a processor and a transceiver, wherein the processor is configured to control the transceiver to perform following operations:
   sending first information in an initial registration process, wherein the first information includes at least one capability identifier, each capability identifier is used for identifying a kind of capability information supported by the terminal device, and the at least one capability identifier is assigned by a manufacturer of the terminal device; wherein the capability identifier corresponds to capability information of the terminal device; wherein the processor is further configured to control the transceiver to perform following operations:
   receiving first indication information, wherein the first indication information is used for indicating the terminal device to report the capability information supported by the terminal device; and in response to the first indication information, sending second information, wherein the second information comprises the capability information supported by the terminal device.

10. The terminal device of claim 9, wherein the first information further comprises manufacturer information of the terminal device.

11. The terminal device of claim 9, wherein the first indication information is specifically used for indicating the terminal device to report at least one piece of following information:
public land mobile network (PLMN) capability information, radio access technology (RAT) capability information, system capability information, frequency band capability information, frequency band combination capability information, or terminal type capability information.

12. A network device, comprising a processor and a transceiver, wherein the processor is configured to control the transceiver to perform following operations:
receiving first information in an initial registration process of an opposite device, wherein the first information comprises at least one capability identifier, each capability identifier is used for identifying a kind of capability information supported by the opposite device, and the at least one capability identifier is assigned by a manufacturer of the opposite device; wherein the capability identifier corresponds to capability information of the terminal device; wherein if the network device does not support the capability identifier assigned by the manufacturer of the opposite device or cannot identify the at least one capability identifier, the processor is further configured to control the transceiver to perform following operations: sending first indication information, wherein the first indication information is used for indicating the opposite device to report the capability information supported by the opposite device; wherein the processor is further configured to control the transceiver to perform following operations: receiving second information, wherein the second information comprises the capability information supported by the opposite device.

13. The network device of claim 12, wherein the first information further comprises manufacturer information of the opposite device.

14. The network device of claim 12, wherein the first indication information is specifically used for indicating the opposite device to report at least one piece of following information:
public land mobile network (PLMN) capability information, radio access technology (RAT) capability information, system capability information, frequency band capability information, frequency band combination capability information, or terminal type capability information.

* * * * *